United States Patent
Shahar et al.

(10) Patent No.: US 7,046,883 B2
(45) Date of Patent: May 16, 2006

(54) PHASE AND POLARIZATION INSENSITIVE GATES AND SWITCHES

(75) Inventors: Arie Shahar, Rye Brook, NY (US); Eldan Halberthal, Rye Brook, NY (US)

(73) Assignee: Prima Luci, Inc., Harrison, NY (US)

( * ) Notice: Subject to any disclaimer, the term of this patent is extended or adjusted under 35 U.S.C. 154(b) by 42 days.

(21) Appl. No.: 10/849,839

(22) Filed: May 21, 2004

(65) Prior Publication Data

US 2004/0223711 A1 Nov. 11, 2004

Related U.S. Application Data

(63) Continuation-in-part of application No. 10/813,108, filed on Mar. 31, 2004, and a continuation-in-part of application No. 10/684,513, filed on Oct. 15, 2003.

(60) Provisional application No. 60/461,796, filed on Apr. 11, 2003, provisional application No. 60/440,037, filed on Jan. 15, 2003, provisional application No. 60/420,112, filed on Oct. 21, 2002.

(51) Int. Cl.
    *G02B 6/00* (2006.01)

(52) U.S. Cl. .............. 385/122; 385/3; 385/5; 385/42; 385/15; 385/16; 385/11

(58) Field of Classification Search .......... 385/1, 385/2, 3, 11, 14, 15, 42, 16–18, 24, 122, 5
    See application file for complete search history.

(56) References Cited

U.S. PATENT DOCUMENTS

| | | | | |
|---|---|---|---|---|
| 4,382,660 A | * | 5/1983 | Pratt et al. | 359/244 |
| 4,597,638 A | * | 7/1986 | Chemla et al. | 359/244 |
| 5,754,714 A | * | 5/1998 | Suzuki et al. | 385/5 |
| 6,624,929 B1 | * | 9/2003 | Kang et al. | 359/344 |
| 6,634,813 B1 | * | 10/2003 | Hall et al. | 398/213 |
| 6,697,548 B1 | * | 2/2004 | LoCascio et al. | 385/16 |

* cited by examiner

Primary Examiner—Brian M. Healy
(74) Attorney, Agent, or Firm—Pearl Cohen Zedek Latzer, LLP

(57) ABSTRACT

In one version, the present invention provides an optical switching device including a splitting device having a first terminal for receiving an input signal and second and third terminals, and an optical loop associated with the second and third terminals and having first and second non-linear elements and first and second directing devices. One of the first and second non-linear elements may receive an activating signal from a third directing device and, in response to the activating signal, cause the optical loop to producing first and second output signals at the first and second directing devices, respectively. In another version, the present invention provides an optical gating device. The present invention also provides an optical switching device that may include two optical gating devices and an optical toggle device.

43 Claims, 3 Drawing Sheets

PHASE AND POLARIZATION INSENSITIVE GATES AND SWITCHES

CROSS-REFERENCE TO RELATED APPLICATIONS

This application is a continuation-in-part of U.S. patent application Ser. No. 10/813,108, filed Mar. 31, 2004, pending entitled "All Optical Logic Gates", which claims the benefit of U.S. Provisional Patent Application Ser. No. 60/461,796, filed on Apr. 11, 2003, entitled "All Optical Logic Gates", the disclosures of both of which are incorporated herein by reference in their entirety.

In addition, this application is a continuation-in-part of U.S. patent application Ser. No. 10/684,513, pending filed Oct. 15, 2003 entitled "All Optical Bistable Devices", which claims the benefit of U.S. Provisional Patent Application Ser. No. 60/420,112, filed Oct. 21, 2002, entitled "Streaming signal control system for digital communications", and of U.S. Provisional Patent Application Ser. No. 60/440,037, filed Jan. 15, 2003, entitled "Streaming signal control system for digital communications", the disclosures of all of which are incorporated herein by reference in their entirety.

FIELD OF INVENTION

The present invention relates to the fields of optical signal processing devices, optical communication devices and systems, and optical computing devices and systems. In particular, the invention relates to the field of optical gating and optical switching devices.

BACKGROUND OF THE INVENTION

In the field of optical communication and optical computing there is a strong demand for optical gates and switches capable of performing very fast execution of controlling and directing optical pulses. One example of such application is inside an ultra fast ADD/DROP node in an optical communication network where optical gates and switches respond rapidly to direct and re-route network traffic in the event of fiber-cut and/or node failure. Another example is in all-optical packet routing using optical gates and switches that are activated and controlled by optical signals to achieve ultra fast response in a very short latency time.

There are various types of electro-optic switches, such as, those that are based on Mach-Zehnder Interferometers (MZI). The activation of such switches is performed by changing the phase of the signal in one branch of the MZI. These switches and others that are activated by changing (shifting) the phase of one optical component of the signal suffer from the following disadvantages.

The process of changing phase includes changing optical properties of the media, by the control signal (activating signal of switch), along which the optical signal or its component propagates. Changing the optical properties of the media from which the switch is fabricated may be achieved electrically, by the control signal, using applied voltage or injected current to change the charge carrier density of the media that results in change in refractive index of the material. Changing the refractive index of the media may also be performed, by the control signal, using thermal process or mechanical pressure produced by piezoelectric crystals. These processes, used to produce phase shift of the signals in the switches, are relatively slow since their speed is limited by the time constant related to the state change of the media from which the phase shifter of the switch is made of and thus can not be used for ultra high speed switches.

Another disadvantage of these switches is related to their basic principle of operation that is based on phase shift. This principle inherently makes these switches sensitive to phase drifts. Accordingly, these switches need be controlled by a closed loop phase control, resulting in a switch that is not a stand alone device, requires external controllers, is complicated, power consuming, and expensive.

Switches that are phase insensitive and fast may be constructed using Non-linear Optical Loop Mirrors. Such a switch, also known as Terahertz Optical Asymmetric Demultiplexer (TOAD), is based on a loop mirror that includes a semiconductor optical amplifier as a phase shifter. While TOAD is fast and phase insensitive since it is activated optically, it still suffers from following three disadvantages.

First, when TOAD is constructed from optical fibers its loop is polarization sensitive due to birefringence of the optical fibers.

A second disadvantage of TOAD is its sensitivity to the pattern of the information pulses. The basic operation principle of TOAD requires that the phase shift of one optical component, propagating in the optical loop, is completed, by the control signal, before the arrival of the second optical component to the phase shifter. The TOAD's principle of operation allows its operation only with Return-to-Zero (RZ) modulation format and is not suitable for Non-Return-to-Zero (NRZ) modulation format, which is the most common format used today.

A third disadvantage of the TOAD is related to the same basic principle of operation as mentioned above. It requires the activating signal be in a form of pulses that are synchronized to the information pulses. This means that the TOAD requires a modulator or oscillator for generating the activating pulses and a clock recovery system for synchronization. All these make the TOAD a device that cannot be controlled by a Continuous Wave (CW) optical beam, is not a stand-alone device, and requires additional systems that make it expensive, complicated, and power consuming.

SUMMARY OF THE INVENTION

It is an object of exemplary embodiments of the present invention to provide fast gates and switches that are phase and polarization insensitive, and are independent to pulse pattern of the information signal.

Another object of exemplary embodiments of the present invention is to provide fast gates and switches that may be activated optically by either pulse signals or CW beam.

Yet another object of exemplary embodiments of the present invention is to provide fast gates and switches that may be activated electrically.

In one exemplary embodiment, the present invention provides an optical gating device including:
  a non-linear element to receive an input signal and to produce an output signal; and
  a directing device able to direct an optical activating signal to the non-linear element,
  wherein the output signal of the non-linear element has one of first and second intensity levels in response to the optical activating signal, and wherein the ratio between the first and the second intensity levels is significantly greater than one.

In another exemplary embodiment, the present invention provides an optical switching device, including:

a splitting device having a first terminal for receiving an input signal and second and third terminals; and an optical loop associated with the second and third terminals and having first and second non-linear elements and first and second directing devices, wherein one of the first and second non-linear elements receives an activating signal from a third directing device and, in response to the activation signal, causes the optical loop to produce first and second output signals at the first and second directing devices, respectively.

In an alternative exemplary embodiment, the present invention provides an optical switching device, including:

a splitting device having an input port for receiving an input signal and first and second output ports;

a first gating device able to receive an input from the first output port of the splitting device;

a second gating device able to receive an input from the second output port of the splitting device;

an optical toggle device arranged to receive an input triggering signal and, in response to the triggering signal, to provide an optical activating signal via first and second output ports to the first and second gating devices, respectively.

DETAILED DESCRIPTION OF EXEMPLARY EMBODIMENTS OF THE INVENTION

Following is detailed description of exemplary embodiments of the present invention related to phase and polarization insensitive, and protocol independent gates and switches, their structures, various embodiments, and modes of operation.

Figure 1:
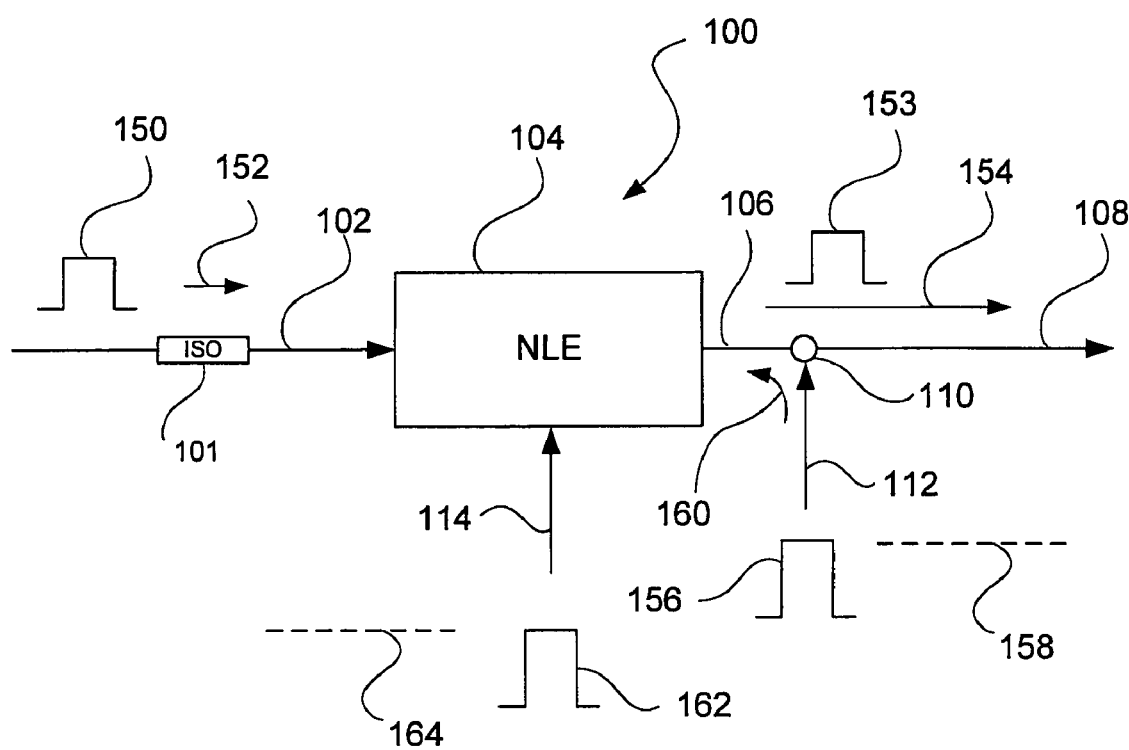
FIG. 1 is a schematic illustration of a phase and polarization insensitive gating device.

FIG. 1 schematically illustrates a phase and polarization insensitive gating device 100 comprising NLE 104, which may be an optical amplifier, such as solid-state optical amplifier, semiconductor optical amplifier (SOA), and Erbium doped fiber amplifier (EDFA), and optical circulator 110. Input signal 152, which may be optical pulse 150, may enter port 102 of NLE 104, get amplified or suppressed inside NLE 104 as discussed below in detail, and emerge at port 106 of NLE 104 as signal 154 (optical pulse 153). Port 102 may include optional optical isolator 101 which may be used to prevent any signal from propagating back into an optical source. Signal 154 may continue to propagate through circulator 110, and finally exit at port 108 of circulator 110. On the other hand, activating signal (control signal) 160, which may be either optical pulse 156 or CW beam 158, may enter port 112 of circulator 110, propagate through circulator 110, and enter NLE 104 at port 106. After undergoing amplification or suppression inside NLE 104, signal 160 then exits at port 102 and may be blocked by isolator 101. As is described in the above, both port 102 and port 106 of NLE 104 serve as input and output ports, and will be referenced hereafter as I/O port 102 and i/o port 106, respectively. As an example and without any limitations, we will also refer to I/O port 102 and port 112 as input and activating ports, respectively.

During normal operation, input signal 152 enters NLE 104 at port 102. In the absence of activating signal 160, either optical pulse 156 or CW beam 158 from port 112, NLE 104 works under normal operation condition. Signal 152 gets amplified inside NLE 104 by a gain factor G before reaching saturation to become $P_{sat}$ and emerges at i/o port 106 as signal 154 (optical pulse 153). Signal 154 then continues to propagate through circulator 110 and finally exits at port 108 of circulator 110. So, under this circumstance when there is no activating signal 160, gating device 100 performs at its "through" state for input signal 152 with amplification provided by NLE 104.

When activating signal 160 is applied to port 112, it propagates through circulator 110 and enters NLE 104 at I/O port 106. Input signal 160 is strong enough to effectively drive NLE 104 into deep saturation. When NLE 104 is saturated, its saturation output power $P_{sat}$ may be fixed and does not increase with the increase of total input power, $P_1$ and $P_2$ received at I/O port 106 and I/O port 102, respectively. The input power $P_1$ received at I/O port 106 is transmitted, by saturated NLE 104, into I/O port 102 as output power $P_{o1}$. Similarly, the input power $P_2$ received at I/O port 102 is transmitted, by saturated NLE 104, into I/O port 106 as output power $P_{o2}$. The saturated output power $P_{sat}$ is distributed, among output power $P_{o1}$ and $P_{o2}$ at i/o port 102 and i/o port 106, in proportion to input power $P_1$ and $P_2$ at i/o port 106 and i/o port 102, respectively. As a result, output power $P_{o2}$ is given by equation $$P_{sat} \cdot \frac{P_2}{P_1 + P_2}.$$

When there is no activating signal 160, $P_1$ is zero, $P_{o2}$ may reach saturation output of $P_{sat}$ depend on the level of input power $P_2$. When $P_1$ is applied to port 112, $P_{o2}$ is smaller than $P_{sat}$ by a factor of $$\frac{P_2}{P_1 + P_2}.$$

When the power of activating signal 160, $P_1$, is much larger than that of input signal 152, $P_2$, only a small fraction of the total saturated output power $P_{sat}$ is contributed toward $P_{o2}$, to emit from i/o port 106. The intensity of light at output port 108 of gating device 100 equals $P_{o2}$ less the insertion loss of circulator 110. The ratio in the intensity of light between when there is and when there is not activating signal 160 is substantially larger than one $$\left(\frac{P_2 + P_1}{P_2} \gg 1\right),$$

and may be larger than 6 dB.

Accordingly, when NLE 104 is deeply saturated, the amplitude of the signal that it transmits, from port 106, is greatly reduced to produce a close to zero signal level to exit at port 108. Correspondingly, gating device 100 acts at its "shut" state with regard to input signal 152.

It is noted in the above that, when activating signal 160 is a CW beam 158, output 154 at port 108 is constantly suppressed. On the other hand, when activating signal 160 is a single pulse or a series of optical pulses 156, the suppression period of output 154 is controlled by the pattern of activating optical pulses.

It is also noted that saturation of NLE 104 depends only on the optical intensity of activating signal 160, whether being optical pulse 156 or CW beam 158, and is not affected by any phase information of optical signal 152, or, in another word, the phase relationship between the electric fields of optical signal 152 and control signal 160. Therefore, gating device 100 is a phase insensitive gating device. The ability to operate gate 100 by activating signal 160 which is in the form of modulated signal 156 or CW beam 158 makes gate 100 protocol transparent and insensitive to the pulse pattern of input signal 152 and activating signal form of either modulated signal or CW beam.

It is further noted that the saturation of NLE 104 depends only on the optical intensity of the activating signal, whether it counter-propagates inside NLE 104 against input signal 156, as described in the exemplary embodiment above, or whether it co-propagates inside NLE 104 along with input signal 156, if launched through port 102 as well.

It is further noted that when NLE 104 is a polarization insensitive component that operates under deep saturation due to activating signal 160, close to zero signal level of input signal 152 exits, as output signal 154, at output port 108 regardless the state of polarization of input signal 152. Therefore, gating device 100 is a polarization insensitive gating device.

It is further noted that the operation condition of NLE 104 is affected by the current injected to NLE 104, via electric port 114, which may include an electric pulse 162 or direct current (DC) 164. In other words, NLE 104 may be driven into active (transmitting and/or amplifying mode) or in-active (blocking, attenuating or absorbing mode) states by an electric activating signal supplied to electric port 114.

Figure 2:
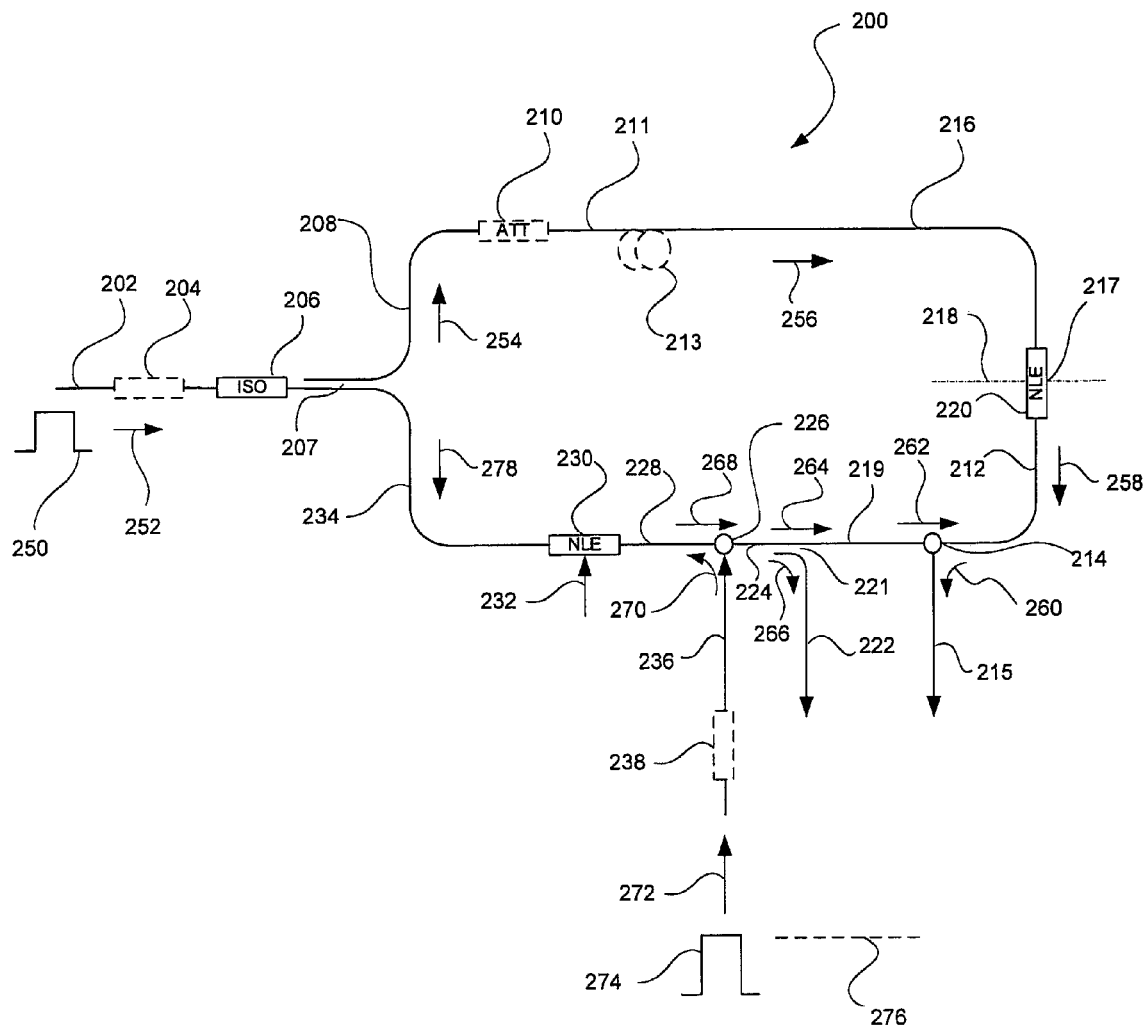
FIG. 2 is a schematic illustration of a phase and polarization insensitive switching device.

FIG. 2 schematically illustrates a phase and polarization insensitive switching device 200 as one of exemplary embodiments of present invention.

Input signal 252, which may be optical pulse 250, may enter input port 202 of switching device 200. Port 202 may include optional optical amplifier 204 and optional optical isolator 206. In such a case, input signal 252 propagates through optional optical amplifier 204 and optional optical isolator 206, and enters directional coupler 207. Here, optional optical amplifier 204 may be used before directional coupler 207 to boost the power level of input signal 252 so that NLE 220 may be properly saturated under certain operation condition, as is discussed below in detail, and optional optical isolator 206 may be used to prevent any loop-back signals from getting back into an optical source. Input signal 252 is split into two pulses, 254 and 278, at directional coupler 207, which has a power splitting ratio of 1 to m, to output branch 208 and 234 respectively, wherein m may be any positive number. Pulse 278 may propagate through NLE 230 and enters circulator 226, via guide 228, as pulse 268. Passing through circulator 226 and guide 224, a portion of pulse 268 exits at output port 222 as signal 266, via directional coupler 221 having a power splitting ratio of 1 to n, to output branches 222 and 219 respectively, wherein n may or may not be the same value as m for directional coupler 207 that may or may not be a symmetric coupler.

The rest of pulse 268, after passing directional coupler 221 to become pulse 264, may continue to propagate through guide 219 and circulator 214 and enter NLE 220 as signal 262 at port 212. Emerging from port 216 of NLE 220, signal 262 may continue to propagate through delay line 213, guide 211, and optical attenuator 210, both delay line and attenuator are optional as is discussed later, to return back to directional coupler 207. Signal 262 may eventually be blocked by optional isolator 206 from exiting at port 202 to avoid interfering with source of input signal 252.

On other branch 208, pulse 254 may propagate through attenuator 210, guide 211, and delay line 213 and then enter NLE 220 at port 216 as signal 256. Emerging from port 212 of NLE 220 as pulse 258, it continues to propagate through optical circulator 214 and finally exits as pulse 260 from port 215 of circulator 214.

As is described above, attenuator 210 and delay line 213 are both optional depend on actual device build-up. Attenuator 210 is used for the adjustment of intensity of pulse 254 so that output power from port 215 and port 222 may be made equal under different switching operating positions. Delay line 213 is applied to adjust time delay so that the two optical paths from directional coupler 207 to center point 217 of NLE 220 as shown by line 218 are made equal. In this way, pulse 254 and pulse 278, split from pulse 252 at directional coupler 207, are made to overlap inside NLE 220 as signals 256 and 262. The use of attenuator 210 may also assure that for splitting ratios m and n of couplers 207 and 221, signal 262 may be made much stronger than signal 256 when these signals overlap inside NLE 220.

We assume that input signal 252 of unity intensity enters port 202. Directional coupler 207 splits input signal 252 into pulse 254 and pulse 278 having a ratio of intensity 1: m correspondingly. Pulse 278 enters NLE 230 via branch 234. In the absence of activating signal 272 (normal state of switch 200), pulse 278 gets amplified inside NLE 230 by a gain factor $G_{230}$ before reaching saturation, and emerges at port 228 as pulse 268. Pulse 268 continues to pass through circulator 226 and enters directional coupler 221 having a power splitting ratio of n: 1 by branch 219 and branch 222 correspondingly. Thus, a portion of pulse 268 exits at the output port 222 of directional coupler 221 with optical intensity that is proportional to the intensity of signal 252 at port 202 by the factor given by:

$$P_{222} = \frac{m}{(m+1)\cdot(n+1)} \times G_{230} \qquad (1)$$

At the same time, the rest of pulse 268 passes through directional coupler 221 to become pulse 264. Pulse 264 continues to propagate through circulator 214 to become pulse 262, and enters NLE 220 via port 212 with optical intensity that is proportional to the intensity of signal 252 at port 202 by the factor given by:

$$P_{262} = \frac{m\cdot n}{(m+1)\cdot(n+1)} \times G_{230} \qquad (2)$$

At the same time, pulse 254, coming from directional coupler 207, passes through attenuator 210, guide. 211, and delay line 213 to become pulse 256 having low intensity $P_{256}$. Pulse signal 256 enters NLE 220 via port 216 with intensity that is proportional to the intensity of signal 252 at port 202 by the factor given by:

$$P_{256} = \frac{1 \cdot A}{(m+1)} \quad (3)$$

Here, A is the attenuation factor of optional attenuator 210. In case that attenuator 210 does not exist, A=1.

Since mid point 217 of NLE 220 is located at center line 218, pulse 256 enters NLE 220 at the same time that pulse 262 enters NLE 220. Due to the high intensity pulse 262 at port 212, NLE 220 operates in deep saturation. Also because $P_{256} \ll P_{262}$, pulse 256 is strongly suppressed inside NLE 220 saturated by pulse 262 to produce a near zero output 258. As a result, there is almost no signal exiting from output port 215.

When activating signal 272, either optical pulse 274 or CW beam 276, is applied to the input port 236 of circulator 226, via optional amplifier 238, signal 272 propagates through circulator 226 and is applied to NLE 230 as signal 270. Optional amplifier 238 ensures that the intensity of signal 270 is strong enough to drive NLE 230 into deep saturation. Consequently, very little or close to zero radiation intensity of signal 268 can emerge at port 228 of NLE 230 to pass through circulator 226 and exit at output port 222. At the same time, signal pulse 254, from branch 208 of directional coupler 207, enters NLE 220 at port 216, get amplified by a gain factor $G_{220}$, and emerges at port 212 of NLE 220 as signal 258. Signal 258 propagates through circulator 214 and exits at output port 215 with intensity that is proportional to the intensity of signal 252 at port 202 by the factor given by:

$$P_{215} = \frac{1 \cdot A}{m+1} \times G_{220} \quad (4)$$

It should be understood that splitting ratios (1:m) and (n:1) of coupler 207 and 221, gain of option,al amplifier 204 and optional attenuator 210, respectively, may be adjusted to assure that the output intensities $P_{222}$ and $P_{215}$ of switch 200, in its different switching states would be equal to each other while still maintaining the required $P_{262} \gg P_{256}$ to assure saturation of NLE 220 by signal 262. For example, when m≫1, n≫1, A=1, m=n, and $G_{230}=G_{220}$ then:

$$\left(P_{256} \approx \frac{A}{m}\right) \ll (P_{262} \approx G_{230}) \text{ and} \quad (5)$$

$$\left(P_{222} \approx \frac{1}{n} \times G_{230}\right) \approx \left(P_{215} \approx \frac{1}{m} \cdot G_{220}\right) \quad (6)$$

As to signal 270 that passes through NLE 230, it enters directional coupler 207 through branch 234, and eventually may get blocked by isolator 206.

The ratio of intensity levels of optical outputs from port 222 and port 215, in response to activating signal 272, is substantially larger than one, and may be larger than 6 dB.

In the above functional description, we have simplified the description by assuming negligible insertion loss of both circulators and directional couplers. It is to be understood that appropriate adjustment to equations (1), (2), (3) and (4) shall be made should these loss values become major factors to overall power evaluation.

It is also to be understood that by the same reasons as detailed in the description of gating device 100, switching device 200 also performs as a phase and polarization insensitive switching device, as well as protocol and pulse pattern of input signal independent.

It is also understood that operation mode of NLE 230 may be affected by the current injected to port 232 toward NLE 230. Therefore, NLE 230 may be driven into active or in-active operation states by an electric control signal that may have the form of a pulse or DC current. Therefore, output signal will be switched from port 222 to port 215.

It is noted that the switching device 200 as shown in FIG. 2 is one of exemplary configurations of this invention, and may contains variation of configuration order of the components.

Figure 3:
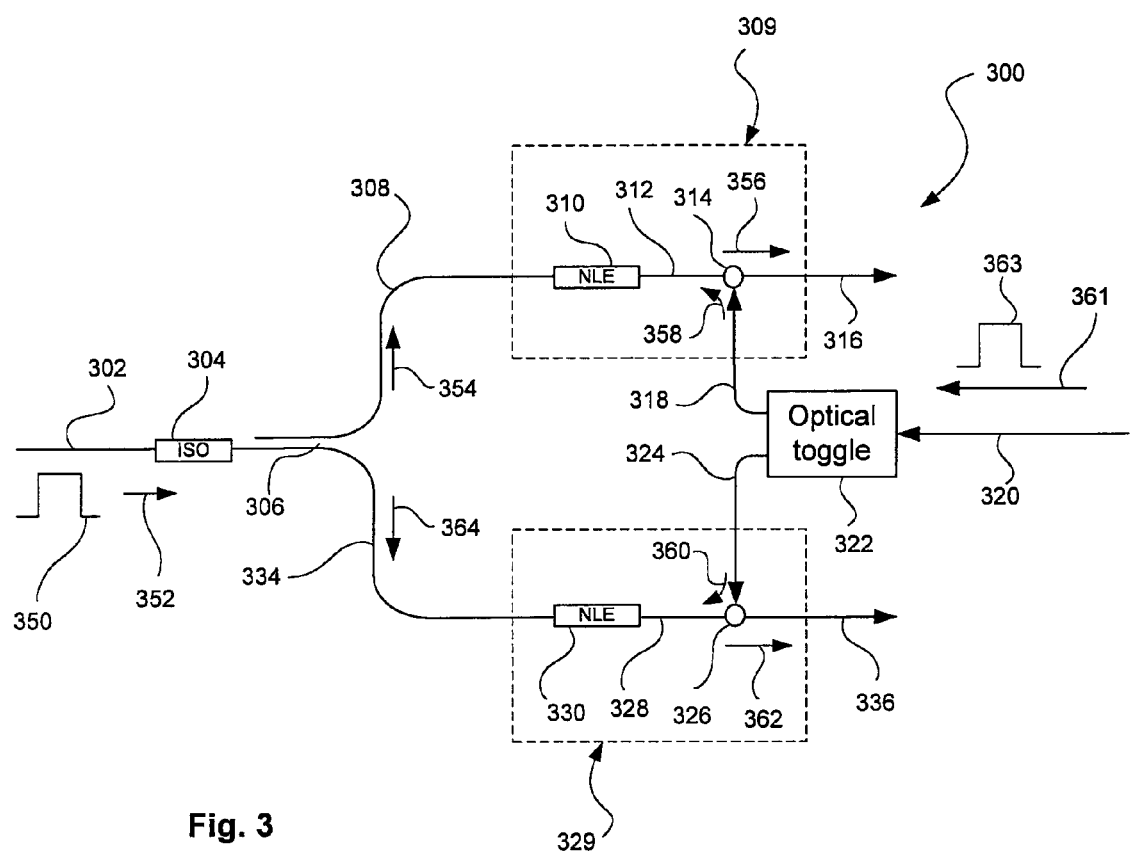
FIG. 3 is a schematic illustration of another phase and polarization insensitive switching device.

In another embodiment, FIG. 3 schematically illustrates an alternative switch configuration 300. In essential, the switch is configured of two optical gating devices as discussed and explained-in the description accompanied to the gate illustrated by FIG. 1. The input ports 308 and 334 of NLE's 310 and 330 corresponding to gates 309 and 329, respectively, are connected to the output ports of directional coupler 306 that may be a symmetric coupler having a power splitting ratio of 1:1. Gates 309 and 329 are controlled by optical toggle device 322, which in turn is controlled, via terminal 320, by external activating signal 361 that may be in the form of pulse 363.

Input signal 352, which may be optical pulse 350, may propagate through input port 302 of directional coupler 306 that may have a power splitting ratio of 1:1, via an optional optical isolator 304, to become pulse 354 and pulse 364. Pulse 354 may enter NLE 310 and come out to become pulse 356 at port 312. Pulse 356 then passes through circulator 314 and exits at output port 316. Similarly, pulse 364 may enter NLE 330 and come out to become pulse 362 at port 328. Pulse 362 then passes through circulator 326 and exits at output port 336.

As one of the operation modes, CW beam 358 comes out of optical toggle device 322 from its output port 318. There is no optical signal at output port 324. NLE 310 is driven into deep saturation by CW beam 358, while NLE 330 works under normal operation condition. Consequently, input signal 352 passes through device 300 and exits at output port 336 as signal 362, with very little or close to zero power level of signal from port 316. When optical pulse 363 is applied to optical toggle 322 via terminal 320, output signals from optical toggle 322 flips. CW beam 360 comes out at port 324 and no signal at port 318. In response, NLE 310 works now under normal operation condition and NLE 330 is driven into deep saturation by CW beam 360. Input signal 352 is switched to exit at port 326 as signal 362.

The ratio of intensity levels of optical outputs from port 316 and 336, in response to optical pulse 363, is substantially larger than one, and may be larger than 6 dB.

Optical toggle device 300 may be of any type and in particular of the type illustrated by FIG. 29B of U.S. patent application Ser. No. 10/684,513, filed Oct. 15, 2003, entitled "All-Optical Bistable Devices", which is hereby thoroughly incorporated by reference.

All the embodiments of invention presented in this application may be realized through a series of optical components connected by light guiding media such as, for example, free-space, optical fibers, planar waveguides, or planar circuits (PLC), which media may be fabricated using integrated optic techniques and/or on-chip manufacturing. Alternatively, All the embodiments according to the present may also be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators might include variable and/or adjustable components.

It should be understood that the use of optical circulators illustrated in the drawings of the embodiments according to the present invention is a directing device, and serves as directing and/or coupling devices having high coupling efficiency. They may be replaced, in all or in part, by any devices performing similar functions as directing and/or coupling optical signal, such as Wavelength Division Multiplexing (WDM) couplers, directional couplers, Y-junction couplers, combiners, beam splitters, dielectric beam splitters, and metallic beam splitters, as typical examples.

It should also be understood that the use of optical isolators in the various embodiments described above is a removing device that may be a wavelength filter and serves the function to separate source signals, either optical pulse or CW beam, from any returning signals. Therefore, they may be implemented using other optical components serving the same function, such as an optical circulator or a WDM coupler as typical examples.

It should further be understood that the use of directional couplers in the various embodiments described above serves the function of dividing input signal, either optical pulse or CW beam, into two different optical paths. Therefore, they may be implemented using other optical components serving the same function, such as an optical beam splitter as a typical example.

It should also be understood that the activating/control signal for the gates and switches according to the present invention may/may not have the same wavelength as the input signal of these gate and switches.

While in some of the illustrations of the embodiments according to the present invention the activating signals are shown as applied in a counter-propagating mode with respect to the input signals, it should be understood that the activating signals according to the present invention may also be applied in a co-propagating mode with respect to the input signals.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An optical gating device comprising:
   a non-linear element to receive an input signal and to produce an output signal; and
   a directing device able to direct an optical activating signal to said non-linear element, wherein the output signal produced by said non-linear element has either a first or a second intensity level in response to said optical activating signal, and wherein the ratio between said first and said second intensity levels is greater than 6 dB.

2. The gating device according to claim 1, wherein said non-linear element is an optical amplifier.

3. The gating device according to claim 1, wherein said non-linear element is selected from a group of components including semiconductor optical amplifiers, solid-state optical amplifiers, and Erbium doped fiber amplifiers.

4. The gating device according to claim 1, wherein said directing device is selected from a group of components including WDM couplers, directional couplers, splitters, and circulators.

5. The gating device according to claim 1, wherein said optical activating signal and said input signal have the same wavelength.

6. The gating device according to claim 1, wherein said optical activating signal and said input signal have different wavelengths.

7. The gating device according to claim 1, wherein said optical activating signal and said input signal have different wavelengths and co-propagate inside said non-linear element.

8. The gating device according to claim 1, wherein said optical activating signal and said input signal counter-propagate inside said non-linear element.

9. The gating device according to claim 1, wherein said optical activating signal drives said non-linear element into a saturated state.

10. The gating device according to claim 1, wherein said optical activating signal is selected from a group of signals including continuous wave beam and pulse signal.

11. The gating device according to claim 1, further comprising an electrical terminal for receiving an electrical activating signal, wherein said non-linear element produces said output signal having one of a first and a second intensity levels in response to said electrical activating signal wherein the ratio between said first and said second intensity levels is substantially greater than one.

12. The gating device according to claim 11, wherein said electrical activating signal drives said non-linear element into an active state.

13. The gating device according to claim 11, wherein said electrical activating signal drives said non-linear element into an in-active state.

14. The gating device according to claim 11, wherein said electrical activating signal is selected from a group of signals including direct current and electrical pulses.

15. The gating device according to claim 1, further comprising a removing device that is selected from a group of components including WDM couplers, isolators, and circulators, for removing said optical activating signal from said non-linear element.

16. The gating device according to claim 1, including at least a portion fabricated in a medium selected from a group of media including free-space, optical fibers, discrete components, integrated optics, and on-chip devices.

17. An optical switching device, comprising:
   a splitting device having a first terminal for receiving an input signal and second and third terminals; and
   an optical loop associated with said second and third terminals and having first and second non-linear elements and first and second directing devices,
   wherein one said first and second non-linear elements receives an activating signal from a third directing device and, in response to the activation signal, causes said optical loop to produce first and second output signals at said first and second directing devices, respectively.

18. The switching device according to claim 17, wherein the ratio of intensity of said first and second output signals from said first and second directing devices is significantly greater than one.

19. The switching device according to claim 17, wherein said splitting device is selected from a group of components including couplers, directional couplers, beam splitters, and splitters.

20. The switching device according to claim 17, wherein said first and second directing devices are selected from a group of components including WDM couplers, directional couplers, beam splitters, splitters, and circulators.

21. The switching device according to claim 17 wherein signals from said second and third terminals of said splitting device experience similar optical delays to arrive at one of said first and second non-linear elements.

22. The switching device according to claim 17, wherein said input signal and said optical activating signal have the same wavelength.

23. The switching device according to claim 17, wherein said input signal and said optical activating signal have different wavelengths.

24. The switching device according to claim 17, wherein said optical activating signal drives one of said first and second non-linear elements into a saturated state.

25. The switching device according to claim 17, wherein said optical activating signal is selected from a group of signals including continuous wave beam and pulse signal.

26. The switching device according to claim 17, wherein output signal from one of said first and second non-linear elements drives the remaining non-linear element into a saturated state.

27. The switching device according to claim 18, wherein said ratio of intensity, in response to an electrical activating signal applied to one of said first and second non-linear elements, is substantially greater than one.

28. The switching device according to claim 27, wherein said electrical activating signal is selected from a group of signals including direct current and electrical pulses.

29. The switching device according to claim 18, wherein said ratio is greater than 6 dB.

30. The switching device according to claim 27, wherein said ratio is greater than 6 dB.

31. The switching device according to claim 17, further comprising at least one component selected from a group of components including an optical delay line, an optical attenuator, an optical isolator, and optical amplifiers.

32. The switching device according to claim 17, including at least a portion fabricated in a medium selected from a group of media including free-space, optical fibers, discrete components, integrated optics and on-chip devices.

33. An optical switching device comprising:
a splitting device having an input port for receiving an input signal and first and second output ports;
a first gating device able to receive an input from the first output port of said splitting device;
a second gating device able to receive an input from the second output port of said splitting device; and
an optical toggle device arranged to receive an input triggering signal and, in response to said triggering signal, to provide an optical activating signal via first and second output ports to said first and second gating devices, respectively.

34. The switching device according to claim 33, wherein the ratio of intensity of output signals from output ports of said first and said second gating devices, in response to said optical activating signal, is significantly greater than one.

35. The switching device according to claim 33, wherein said splitting device is selected from a group of components including couplers, directional couplers, beam splitters, and splitters.

36. The switching device according to claim 33, wherein said optical activating signal and said input signal have the same wavelength.

37. The switching device according to claim 33, wherein said optical activating signal and said input signal have different wavelengths.

38. The switching device according to claim 33, wherein said optical activating signal drives one of said first and said second gating devices into a saturated state.

39. The switching device according to claim 33, wherein said optical activating signal is a continuous wave beam.

40. The switching device according to claim 33, wherein said optical activating signal toggles between said first and said second output ports of said optical toggle device.

41. The switching device according to claim 34, wherein the ratio is greater than 6 dB.

42. The switching device according to claim 33, further comprising an optical isolator.

43. The switching device according to claim 33, including at least a portion fabricated in a medium selected from a group of media including free-space, optical fibers, discrete components, integrated optics and on-chip devices.

* * * * *